United States Patent
Hu et al.

(10) Patent No.: US 12,051,008 B2
(45) Date of Patent: Jul. 30, 2024

(54) GENERATING RELIABILITY MEASURES FOR MACHINE-LEARNED ARCHITECTURE PREDICTIONS

(71) Applicant: Salesforce, Inc., San Francisco, CA (US)

(72) Inventors: Donglin Hu, Dublin, CA (US); Yuxi Zhang, Palo Alto, CA (US); Kexin Xie, San Mateo, CA (US); Chen Xu, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 81 days.

(21) Appl. No.: 17/883,503

(22) Filed: Aug. 8, 2022

(65) Prior Publication Data
US 2024/0046115 A1 Feb. 8, 2024

(51) Int. Cl.
*G06N 5/022* (2023.01)
*G06Q 30/0241* (2023.01)

(52) U.S. Cl.
CPC .......... *G06N 5/022* (2013.01); *G06Q 30/0241* (2013.01)

(58) Field of Classification Search
CPC .......... G06N 5/022; G06N 7/01; G06N 20/00; G06Q 30/0241
USPC .................................... 706/12, 11; 705/26.7
See application file for complete search history.

(56) References Cited

U.S. PATENT DOCUMENTS

| | | | | |
|---|---|---|---|---|
| 9,031,870 B2* | 5/2015 | Kenedy | ............... | G06F 16/9535 705/26.7 |
| 9,088,533 B1* | 7/2015 | Zeng | ..................... | H04L 51/234 |
| 2010/0174609 A1* | 7/2010 | Bax | ........................ | G06Q 30/08 705/36 R |
| 2011/0047025 A1* | 2/2011 | Demir | ............... | G06Q 30/0256 705/14.54 |
| 2011/0131160 A1* | 6/2011 | Canny | ..................... | G06Q 30/02 706/12 |
| 2012/0023043 A1* | 1/2012 | Cetin | ................ | G06Q 30/0254 706/12 |

(Continued)

OTHER PUBLICATIONS

Ritwick Roy, Neural Networks: Forward pass and Backpropagation, 2022 (Year: 2022).*

(Continued)

*Primary Examiner* — Tarek Elchanti
(74) *Attorney, Agent, or Firm* — Butzel Long

(57) ABSTRACT

A prediction system of an online system deploys one or more machine-learned architectures to generate predictions. In one embodiment, the machine-learned architecture is a stacked ensemble model. The stacked ensemble model includes a plurality of base models, where a base model is coupled to receive input data and generate a base prediction for the input data. The stacked ensemble model includes a meta model that combines the base predictions to generate a meta prediction for the input data. The prediction system also generates a reliability measure that takes advantage of the base predictions to evaluate the reliability of the meta prediction. In this manner, while the quality of individual predictions may differ from one another depending on the values of the input data, the prediction system can dynamically generate the reliability measure to account for this variation.

20 Claims, 5 Drawing Sheets

(56) References Cited

U.S. PATENT DOCUMENTS

| | | | |
|---|---|---|---|
| 2015/0088788 A1* | 3/2015 | Traupman | G06N 20/00 |
| | | | 706/11 |
| 2017/0220926 A1* | 8/2017 | Chhabra | G06N 20/00 |
| 2018/0176578 A1* | 6/2018 | Rippel | G06V 30/19173 |
| 2018/0285738 A1* | 10/2018 | Bouton | G06F 16/24568 |
| 2019/0012697 A1* | 1/2019 | Nemani | G06N 3/042 |
| 2019/0080246 A1* | 3/2019 | Sun | G06Q 30/0201 |
| 2019/0138946 A1* | 5/2019 | Asher | G06N 5/04 |
| 2020/0160389 A1* | 5/2020 | Yang | G06F 16/951 |
| 2020/0302309 A1* | 9/2020 | Golding | G06N 5/04 |
| 2022/0198486 A1* | 6/2022 | Gin | G06N 3/006 |

OTHER PUBLICATIONS

Wikipedia, "Inequality of arithmetic and geometric means," undated, 16 pages, [Online] [Retrieved on Feb. 15, 2023] Retrieved from the internet <URL:https://en.wikipedia.org/wiki/Inequality_of_arithmetic_and_geometric_means>.

* cited by examiner

GENERATING RELIABILITY MEASURES FOR MACHINE-LEARNED ARCHITECTURE PREDICTIONS

BACKGROUND

This disclosure generally relates to generating predictions using machine-learned architectures, and more specifically to determining reliability measures for predictions generated using machine-learned architectures.

Many online systems use prediction systems to generate predictions for certain target variables and make decisions based on these predictions. For example, an enterprise that provides a subscription service to users may generate predictions for target variables such as user click-through rate or e-mail open rate and make business decisions based on these predictions. A prediction system may use one or more machine-learned architectures to generate the predictions. A machine-learned architecture may include one or more machine-learned models that are each trained based on labeled or unlabeled training data.

Specifically, a machine-learned model is coupled to receive one or more input data (e.g., user information) and generate predictions for a respective target variable (e.g., e-mail open rate) based on the instance of input data. The prediction generated by the machine-learned model is an estimate that is associated with a high likelihood of being the value for the respective target variable based on trained parameters of the machine-learned model. However, another important estimate is the reliability of the prediction. The reliability indicates a degree of confidence on how close the prediction is to the actual value of the target variable for a data instance. The online system may make decisions based on prediction values and the reliability of the predictions.

However, estimating the reliability of a machine-learned model is difficult. One method is to evaluate a performance metric that indicates a predicted error of the machine-learned model against a validation dataset as part of the training process of the model. However, during the inference process, the model may generate predictions of different quality depending on the values of the input data, and such a method may not account for this variation but rather assumes that the predictions have the same degree of reliability. Another method is to use probabilistic machine-learned models and obtain the confidence interval from an estimated distribution of the target variable. However, this method can only be applied to probabilistic models, and it is computationally challenging to obtain the estimated distribution.

Figure 1:
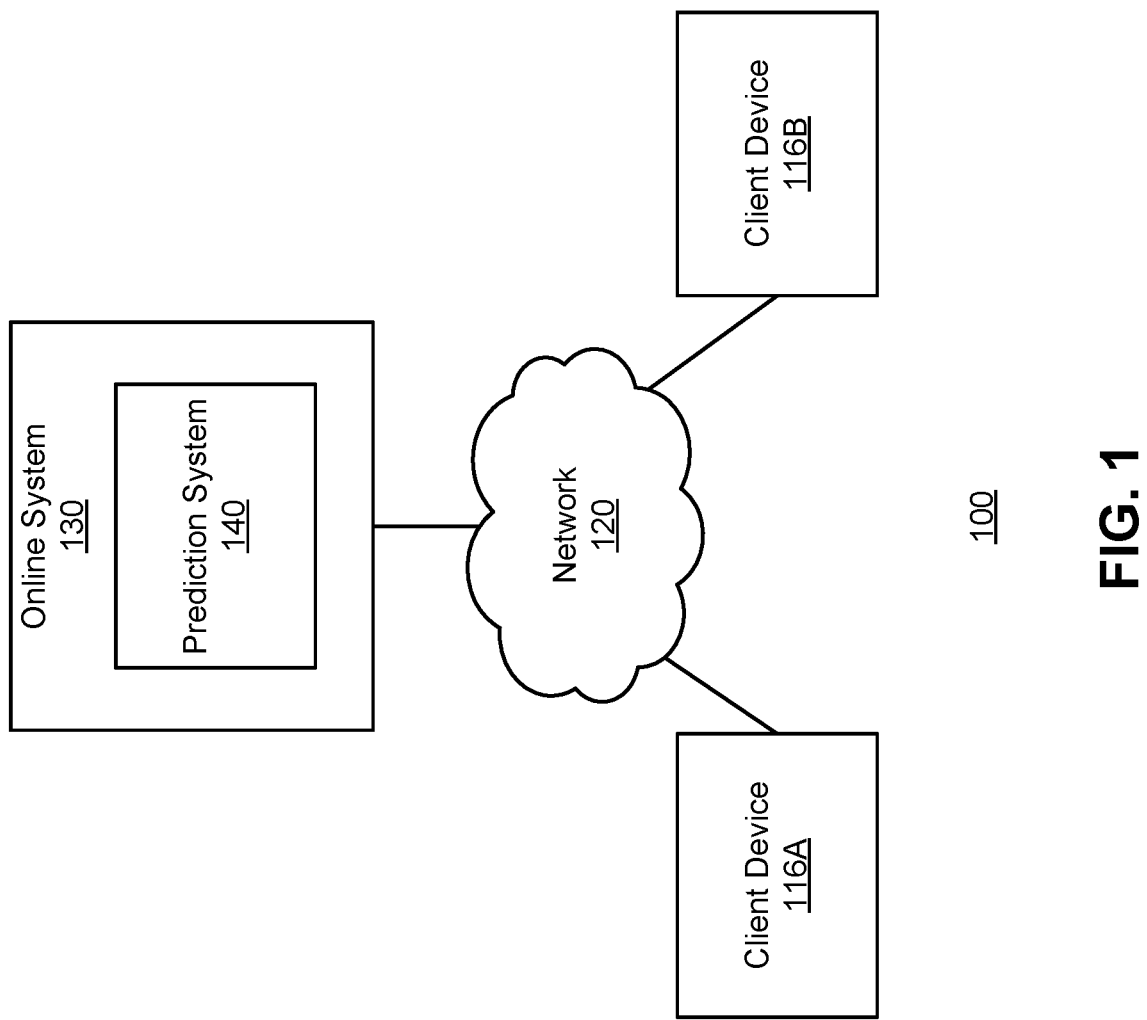
FIG. 1 is a block diagram of a system environment including an online system and one or more client devices, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

The figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "client device 110" in the text refers to reference numerals "client device 110A" and/or "client device 110B" in the figures).

DETAILED DESCRIPTION

Overview

A prediction system of an online system deploys one or more machine-learned architectures to generate predictions. In one embodiment, the machine-learned architecture is a stacked ensemble model. The stacked ensemble model includes a plurality of base models, where a base model is coupled to receive input data and generate a base prediction for the input data. The stacked ensemble model includes a meta model that combines the base predictions to generate a meta prediction for the input data. The prediction system also generates a reliability measure that takes advantage of the base predictions to evaluate the reliability of the meta prediction. In this manner, while the quality of individual predictions may differ from one another depending on the values of the input data, the prediction system can dynamically generate the reliability measure to account for this variation.

Specifically, the prediction system receives a request including a query. Responsive to receiving the request, the prediction system generates a plurality of base predictions by applying the plurality of machine-learned models to the query as input data and generates a meta prediction by combining the base predictions for the query. The prediction system computes a reliability measure for the meta prediction by obtaining a prior distribution of the target variable and generating a likelihood function of the meta prediction given different values of the target variable. The likelihood function may be determined based on the meta prediction and the plurality of base predictions. The prediction system generates a posterior distribution of the target variable given the meta prediction by combining the prior distribution with the likelihood function. The prediction system determines the reliability measure for a given confidence level that indicates a range the meta prediction could be in. The prediction system provides the predictions as well as the reliability measure as a response to the request.

System Environment

FIG. 1 is a block diagram of a system environment 100 including an online system 130 and one or more client devices 116, in accordance with an embodiment. The system environment 100 shown in FIG. 1 comprises an online system 130, one or more client devices 116A, 116B, and a network 120. The online system 130 may additionally include a prediction system 140. In alternative configurations, different and/or additional components may be included in the system environment 100.

The online system 130 is a system or platform with computing resources for providing one or more online services to entities. In one embodiment, the online system 130 is a cloud platform that provides computing resources, such as storage, computing infrastructure, applications, and the like to entities on an on-demand basis via the network 120. In such an embodiment, the cloud platform may allow entities, such as organizations and large-scale enterprises, to reduce upfront costs for setting up computing infrastructure, and may also allow the entities to deploy applications up and running faster with less maintenance overhead. The cloud platform may also allow entities to adjust computing resources to rapidly fluctuating and unpredictable demands. The entities can create data centers using instances of the cloud platform for use.

In one embodiment, the online system 130 includes a prediction system 140 for generating predictions for one or more target variables. The predictions are used to perform any task useful for the online system 130, for example, any task that improves the online services provided to entities associated with the online system 130. For example, the online system 130 may provide online services to a large-scale enterprise for deploying marketing campaigns to improve user engagement for the enterprise's user base. As an example, a marketing campaign may be an e-mail campaign that promotes one or more products or services of the enterprise through e-mails to users. As another example, the online system 130 may generate predictions with respect to various aspects of the internal infrastructure of the online system 130, e.g., wait times for request queues, that may provide guidance on how the online system 130 should allocate resources to service user requests.

The prediction system 140 generates predictions that are estimated values for a target variable given respective instances of input data. For example, the prediction system 140 may generate predictions on e-mail open rates for a set of users of the enterprise, in which a prediction for a user is based on input data describing the profile of the user. The predictions can be used by the enterprise or the online system 130 to update the marketing campaign to better improve user engagement. For example, the online system 130 may send e-mail marketing content to users who have high predicted e-mail open rates. As another example, the prediction system 140 may generate predictions on the wait time for requests to an application. The predictions can be used by the online system 130 to perform optimal load balancing for the application.

The prediction system 140 deploys one or more machine-learned architectures to generate predictions. A machine-learned architecture may include one or more machine-learned models that are each trained based on labeled or unlabeled training data. A machine-learned model is coupled to receive an instance of input data (e.g., user information) and generate predictions for a respective target variable (e.g., e-mail open rate) based on the input data. The prediction may be an estimated value that is associated with a high likelihood of being the value for the target variable based on trained parameters of the machine-learned model. Depending on the type of the target variable, the prediction value may be a numerical value that quantifies a discrete or continuous quantity or a categorical value in which the data instance is assigned to one or more categories and the prediction encodes one out of the one or more categories. For example, the prediction for a target variable of e-mail open rate may have a continuous numerical value as the prediction indicates a likelihood that a user will open e-mail marketing content.

However, another important estimate is the reliability of the prediction. Since a prediction is an estimated value, there may be a degree of variation in the estimate depending on how reliable the prediction is. In other words, the reliability indicates a degree of confidence in how close the prediction is to the actual true value of the target variable for a data instance. Even though the actual value for the data instance is unknown at the time of prediction, a prediction with a low degree of reliability would indicate that there is a high likelihood the actual value for the data instance might be far away from the prediction, while a high degree of reliability would indicate that there is a low likelihood the actual value is near the prediction value. The online system 130 may make decisions based on prediction values and the reliability of the predictions. For example, the online system 130 may make business decisions based on predictions that are associated with a high degree of reliability while ignoring predictions that are associated with a low degree of reliability.

However, estimating the reliability of a machine-learned model is difficult. One method is to evaluate a performance metric that indicates a predicted error of the machine-learned model against a validation dataset as part of the training process of the model. However, during the inference process, the model may generate predictions of different quality for different data instances depending on how close the input data is to training data that the machine-learned model has been exposed to. Intuitively, the machine-learned model may generate predictions of high-reliability if the corresponding input data is very similar to the training data. However, such a method may not account for this variation but rather assumes that predictions across different data instances have the same degree of reliability. Another method is to use probabilistic machine-learned models and obtain a confidence interval from an estimated distribution of the target variable. However, this method can only be applied to probabilistic models, and it is computationally challenging to obtain the estimated distribution.

In one embodiment, the prediction system 140 generates reliability measures for predictions that dynamically account for differences in the prediction quality across different data instances. This method can be performed as predictions are generated during the inference process. The prediction system 140 may train one or more machine-learned architectures and store the architectures in a database. Specifically, a machine-learned architecture may be composed of one or more machine-learned models.

Figure 2:
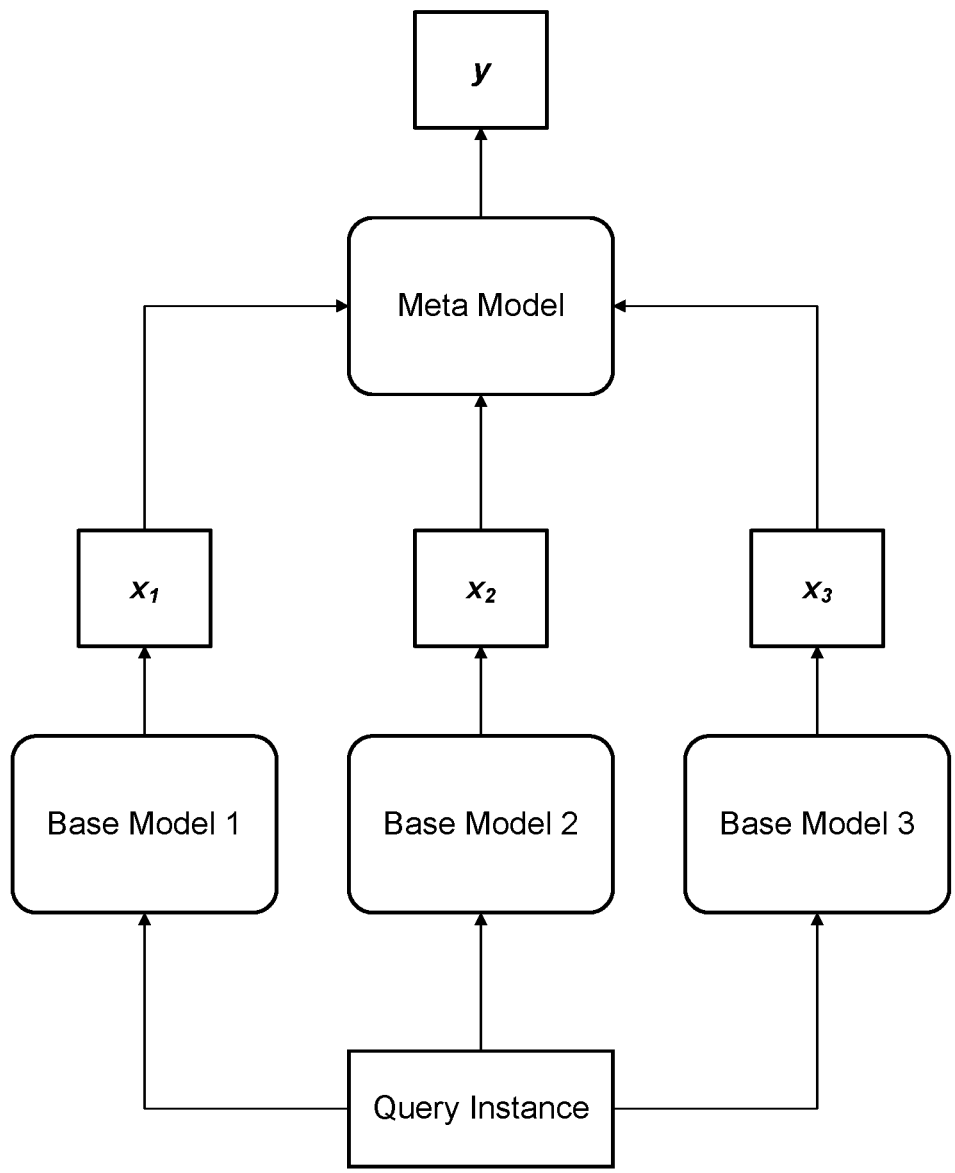
FIG. 2 illustrates a process for dynamically generating a reliability measure for a machine-learned architecture, in accordance with an embodiment.

FIG. 2 illustrates a process for dynamically generating a reliability measure for a machine-learned architecture, in accordance with an embodiment. In one embodiment, the machine-learned architecture is configured as a stacked ensemble model. The stacked ensemble model includes a plurality of base models and a meta model. For example, the stacked ensemble model 200 shown in FIG. 2 includes a plurality of base models including Base Model 1, Base Model 2, and Base Model 3, and a meta model. A base model may be a machine-learned model coupled to receive input data and generate one or more base predictions with respect to one or more target variables for the input data. For example, a base model may be coupled to receive a set of features describing a user as input data and generate a base prediction indicating a predicted e-mail open rate for the user if the user was sent an e-mail promotion.

The plurality of base models may be of the same or different categories of machine-learned model but may differ from one another with respect to the structure or the set of parameters of the model. Thus, the plurality of base models may be diverse in the sense that each base model processes the input data differently or might combine different types of information to generate a prediction. For example, in FIG. 2, Base Model 1 may be configured as a random forest classifier (RFC) with a depth of ten splits, Base Model 2 may be configured as a fully connected neural network, and Base Model 3 may also be configured as a neural network but with four branching portions.

Moreover, depending on the structure and the training data used to train the base models, the plurality of base models may differ from one another with respect to the input data the base model is coupled to receive and the target variables the base model is configured to predict. For example, in FIG. 2, Base Model 1 and Base Model 3 may each be coupled to receive a set of features describing a user and generate a base prediction predicting an e-mail open rate of the user. Differently, Base Model 2 may be coupled to receive a first set of features describing a user and a second set of features describing a content item and generate a first base prediction predicting an e-mail open rate of the user and a second base prediction predicting a click rate (CTR) of the user for a content item included in the e-mail.

The meta model is coupled to receive one or more of the base predictions generated by the plurality of base models and generate a meta prediction for a respective target variable by combining the base predictions. Specifically, for a given target variable, the meta model may be configured to combine the base predictions for the same target variable. For example, in FIG. 2, the meta model may be configured to combine the base predictions from Base Model 1, Base Model 2, and Base Model 3 for e-mail open rate and generate a meta prediction as the final prediction for e-mail open rate. Thus, the meta prediction is a final prediction for the target variable, and by combining base predictions from an ideally diverse set of base models, the general error for prediction can be decreased and the ensemble of base models can provide better performance than individual models alone. In one embodiment, the meta model itself is a machine-learned model, and the meta prediction is generated by applying a trained set of parameters of the meta model to the base predictions for the target variable.

In one embodiment, a machine-learned architecture is configured as a stacked ensemble model for the remainder of the specification. However, it is appreciated that in other embodiments, a machine-learned architecture can be one or any combination of machine-learned models that can be used to generate predictions. For example, a machine-learned architecture may refer to a single machine-learned model. Alternatively, a machine-learned architecture may refer to a stacked structure of machine-learned models, where the stacked structure includes a hierarchy of models, in which the output of one model is fed as input to the next model in the hierarchy, and so on, until a final prediction is generated.

The online system 130 receives a request to generate one or more predictions for one or more target variables. The request may specify a query or information for a query that can be input to a machine-learned architecture that the prediction is generated for. In one instance, the online system 130 receives the request from one or more entities associated with the online system 130. For example, an entity may forward a query instance that describes a user of the entity and request the online system 130 to generate a prediction for the user. In another instance, the online system 130 directly receives the request from a client device 116 of a user of an entity associated with the online system 130, and the online system 130 may formulate a query by collecting information from the client device 116.

Alternatively, the online system 130 may formulate a request internally. For example, the online system 130 may receive authorization from an entity to provide content items to users of the entity. In such an instance, the online system 130 may formulate requests for predictions for a subset of users such that the online system 130 can target content items to users having a high prediction likelihood of interacting with the content item. The online system 130 may forward the request to the prediction system 140 and receive a response including the predictions for the query as well as a reliability measure for the query.

Responsive to receiving the request, the prediction system 140 generates a plurality of base predictions by applying the plurality of base models to the query instance as input data. For example, in FIG. 2, a base prediction $x_1$ is generated by applying the Base Model 1 to a query instance, a base prediction $x_2$ is generated by applying Base Model 2 to the query instance, and a base prediction $x_3$ is generated by applying the Base Model 3 to the query instance. The prediction system 140 generates a meta prediction by applying the meta model to the base predictions. For example, in FIG. 2, a meta prediction y is generated by applying the meta model to the base predictions $x_1$, $x_2$, and $x_3$. In one embodiment, the meta model is itself a machine-learned model and the meta model is associated with a trained set of weights. A base prediction is associated with a respective weight that may indicate the importance of the base prediction in generating the meta prediction. The meta prediction is generated by weighting each base prediction with the respective weight, and combining the weighted base predictions together via, for example, a sum.

The prediction system 140 also computes a reliability measure for the meta prediction by obtaining a posterior distribution of the target variable given the meta prediction value. Specifically, the posterior distribution is generated by obtaining a prior distribution of the target variable and generating a likelihood function of the meta prediction given different values of the target variable. The prior distribution of the target variable is a probability distribution of the target variable before taking into account the base prediction values and the meta prediction value. In one embodiment, the prior distribution of the target variable is obtained from existing data instances for which actual values of the target variable are known. The likelihood function is a probability distribution of the meta prediction given different values of the target variable and is determined based on the base prediction values and the meta prediction value.

The prediction system 140 generates a posterior distribution of the target variable given the meta prediction by combining the prior distribution with the likelihood function. In one instance, the prior distribution is multiplied with the likelihood function. Based on the posterior distribution of the target variable, the prediction system 140 determines the reliability measure for a given confidence level that indicates a range the meta prediction for the query instance could be in. Thus, a large confidence interval indicates a relatively low reliability of prediction, while a narrow confidence interval indicates a relatively high reliability of prediction. The prediction system 140 provides the predictions as well as the reliability measure as a response to the request, such that the online system 130 or entities associated with the online system 130 may apply the predictions and the reliability measure for the prediction to make decisions.

Returning to FIG. 1, the client devices 116 are computing devices that display information to users and communicates user actions to the online system 110. While two client devices 116A, 116B, are illustrated in FIG. 1, in practice many client devices 116 may communicate with the online system 130 in system environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone or another suitable device. A client device 116 is configured to communicate via the network 120, which may comprise any combination of local area and/or wide area networks, using both wired and/or wireless communication systems.

In one embodiment, a user of the client device 116 may be a user of an entity associated with the online system 130. Since the online system 130 provides online services to the entity, the user of the client device 116 may receive various forms of communication from the online system 130 and/or provide action information to the online system 130 that describe actions the user takes using the client device 116. For example, a user of a client device 116 may receive e-mail marketing from the online system 130 on behalf of the entity, and the action information provided to the online system 130 may include whether the user opened the e-mail or took other actions on the e-mail.

In another embodiment, the client device 116 may be affiliated with an entity associated with the online system 130. For example, a user of the client device 116 may be an administrator acting in a representative capacity on behalf of an entity associated with the online system 130. In such an embodiment, the client device 116 executes an application allowing the user of the client device 116 to interact with the online system 130. For example, a client device 116 executes a browser application to enable interaction between the client device 116 and the online system 130 via the network 120. In another embodiment, the client device 116 interacts with the online system 130 through an application programming interface (API) running on a native operating system of the client device 116, such as IOS® or ANDROID™.

The user of the client device 116 as an administrator may request the online system 130 generate predictions on one or more query instances with respect to a target variable. For example, an administrator of an entity, through a respective client device 116, may request the online system 130 to generate predictions on potential click-through rates for a content item for one or more query instances corresponding to one or more users of the entity. Moreover, the user of the client device 116 may also provide existing data that include data instances and actual values for the target variable. The online system 130 can provide the existing data to the prediction system 140 to be used as training data for training the one or more machine-learned architectures.

Alternatively, an administrator of an entity may authorize the online system 130 to directly communicate with users of the entity and collect action information directly from the users. For example, through an application of the online system 130, the administrator of an entity may set up a marketing campaign and authorize the online system 130 to send content items or other forms of marketing communication to users of the entity. The administrator may also authorize the online system 130 to collect information (if approved by the end user), such as action information, from users of the entity that can be used to construct training data for training the machine-learned architectures.

Prediction System

Figure 3:
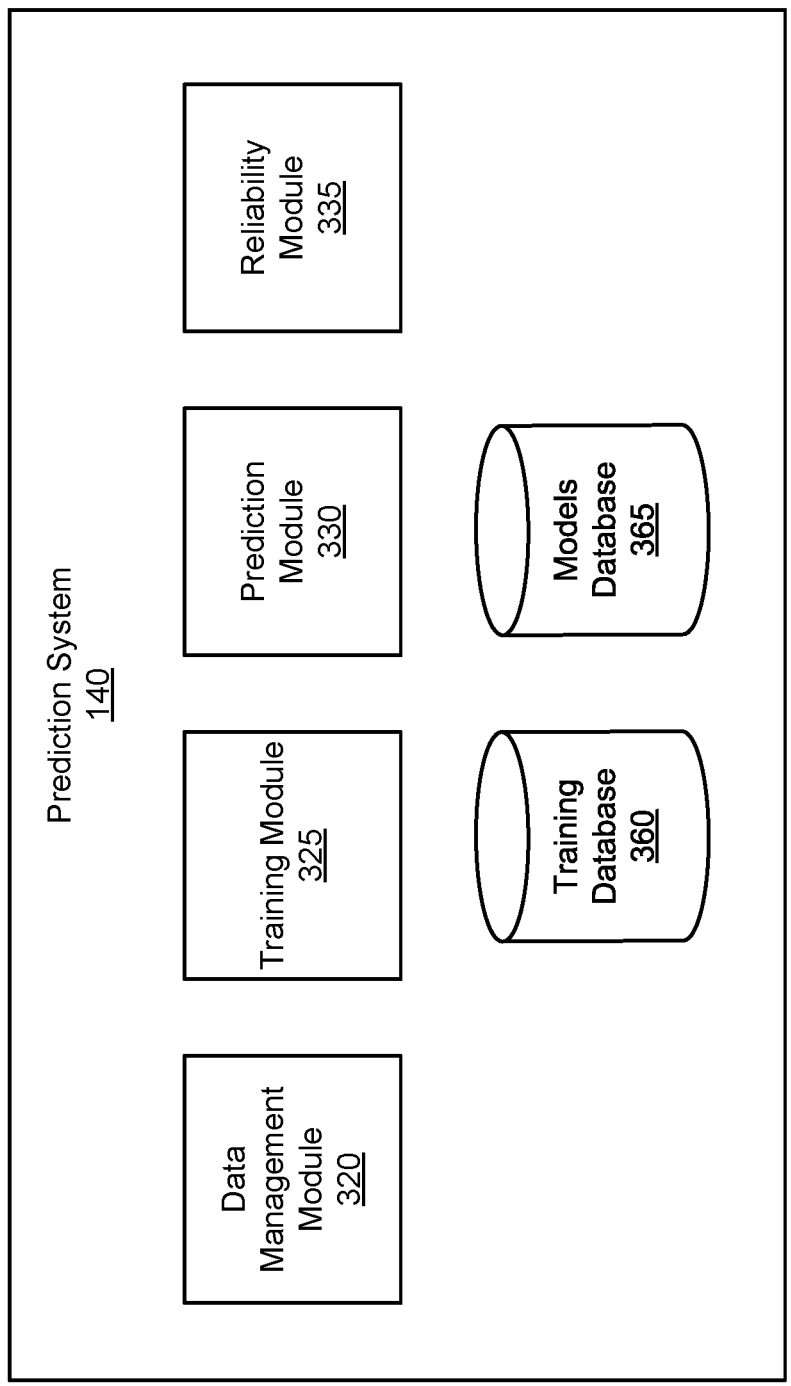
FIG. 3 is a block diagram of an architecture of a prediction system in the cloud platform, in accordance with an embodiment.

FIG. 3 is a block diagram of an architecture of a prediction system 140 in the online system 130, in accordance with an embodiment. The prediction system 140 comprises modules including a data management module 320, a training module 325, a prediction module 330, and a reliability module 335. The prediction system 140 also includes a training database 360 and a models database 365. Some embodiments can have different modules than those described here. Similarly, the functions described among the modules can be distributed in a different manner than is described here.

The training database 360 includes training data that can be used to train one or more machine-learned architectures. The data management module 320 generates and manages training data in the training database 360. The training data may include a plurality of training instances. A training instance includes input data and actual values for one or more target variables that are already known for the training instance. The input data of a training instance may be of the same data type as a query instance the machine-learned architecture will process for a request, and the actual values may encode the already known outcome of the target variables for that training instance. For example, the training data for a machine-learned architecture coupled to receive user information of a user and generate a prediction on e-mail open rate of the user may include a plurality of training instances. Each training instance may include input data describing user information of a respective user and an actual value that indicates whether the respective user opened e-mail marketing material provided to the user. In one embodiment, when the machine-learned architecture to be trained is a stacked ensemble model, the training data may additionally be organized with respect to each base model in the plurality of base models. For example, some base models may be configured to process input data encoded differently from other base models, and thus, for a given base model, the training data may include input data in the format the base model can process as well as the actual values for target variables the base model is configured to predict.

The actual value for a target variable may be a numerical value or a categorical value in the training data. For example, while the prediction for a target variable may be configured as a numerical value (e.g., likelihood between 0 to 1), the actual value for the target variable in the training data may be encoded as categorical value of 0 or 1 depending on whether the respective user opened the e-mail or not. As another example, the prediction for a target variable may be configured as a categorical value in which a discretized number indicates a respective category, and the actual value for the target variable in the training data may also be encoded as a categorical value encoding the category of the respective data instance.

The data management module 320 may obtain the training data from users of client devices 116 as users generate action information on the devices. Alternatively, the data management module 320 may receive information from an entity associated with the online system 130 and construct the training data from the received information. In one embodiment, as predictions are generated and decisions are made based on the predictions, the data management module 320 may collect updated action information or other types of information that can be used to train the one or more machine-learned architectures and update the training data in the training database 360 at predetermined intervals or when updated information becomes available.

The training module 325 trains one or more machine-learned architectures for generating predictions based on the training data in the training database 360. In one instance, the machine-learned architecture is a stacked ensemble model. In one embodiment the stacked ensemble model is trained in two phases. During the first phase, the training module 325 trains each of the plurality of base models. During the second phase, the training module trains the meta model.

Specifically, during the first phase, the training module 325 trains each of the base model in the plurality of base models of the stacked ensemble model. In one embodiment, the training module 325 trains each base model by repeatedly iterating between a forward pass step and a backpropagation step to reduce a loss function. During the forward pass step, for a base model, the training module 325 selects a subset of training data for the base model. The training module 325 generates a set of estimated outputs by applying parameters of the base model to the input data of the selected subset. The training module 325 determines a loss function that indicates a difference between the estimated outputs and the actual values of the target variables for the selected subset. During the backpropagation step, the training module 325 updates parameters of the base model based on error terms obtained from the loss function. This process is repeated until a convergence criterion is reached for the set of parameters, and the training module 325 may store the trained based models in the models database 365.

During the second phase, when the meta model of the stacked ensemble model is also a machine-learned model, the training module 325 trains the meta model of the stacked ensemble model. In one embodiment, before starting a training process, the training module 325 may divide the training data in the training database 360 such that there is a dedicated set of training instances for training the plurality of base models, and set aside the remaining set of training instances as a testing set. For the testing set, the training module 325 generates base predictions by applying the plurality of trained base models to the input data of the testing set. The training module 325 determines parameters of the meta model by applying parameters of the meta model to the base predictions to generate estimated outputs for the testing set. The training module 325 reduces a loss function indicating a difference between the estimated outputs and the actual values of the target variables for the testing set. The parameters may be trained by iterating between a forward pass step and a backpropagation step, or by a regression method. As described in conjunction with FIGS. 1 and 2, in one embodiment, the meta model is configured as a linear regression model, and the trained parameters are a set of weights that are each assigned to a respective base model in the stacked ensemble model.

The prediction module 330 receives requests from the online system 130 to generate predictions based on one or more query instances. The request may include a query instance that is formatted in a way that can be processed by the base model, or may include information the prediction module 330 can use to formulate such a query instance. As described in conjunction with FIG. 1, responsive to receiving the request, the prediction module 330 generates a plurality of base predictions by applying the plurality of base models to the query instance as input data. The prediction module 330 generates a meta prediction by applying the meta model to the base predictions.

In one embodiment, the prediction module 330 provides the predictions to the reliability module 335 such that a reliability measure for the predictions can be determined. The prediction module 330 receives the reliability measure from the reliability module 335 and provides the predictions as well as the reliability measure to an appropriate module of the online system 130, such that the online system 130 or entities associated with the online system 130 may make decisions based on the predictions and the reliability measure for the predictions.

Responsive to receiving the predictions from the prediction module 330, the reliability module 335 computes a reliability measure for the meta prediction by obtaining a posterior distribution of the target variable given the meta prediction value. The posterior distribution is generated by obtaining a prior distribution of the target variable and generating a likelihood function of the meta prediction given different values of the target variable. Specifically, based on the Bayes formula, since the posterior probability $p_{post}(\mu|y)$ of the target variable $\mu$ given the meta prediction y can be decomposed as:

$$p_{post}(\mu \mid y) = \frac{p_{prior}(\mu) \times p_{like}(y \mid \mu)}{\int_\mu p_{prior}(\mu) \times p_{like}(y \mid \mu) d\mu}$$

where $p_{prior}(\mu)$ is the prior distribution of the target variable and $p_{like}(y|\mu)$ is the likelihood function of the meta prediction given the target variable. The posterior distribution of the target variable can be determined once the prior distribution and the likelihood function are determined and by applying a normalization factor (e.g., denominator in the equation above).

The reliability module 335 obtains a prior distribution $p_{prior}(\mu)$ of the target variable that is a probability distribution of the target variable before taking into account the base prediction values and the meta prediction value. In one embodiment, the prior distribution of the target variable is obtained from existing, historical data instances for which actual values of the target variable are known, for example, the training data stored in the training datastore 360. For example, for a machine-learned architecture configured to predict e-mail open rate, the existing data instances may be training instances that have actual values for e-mail open rates of users. As another example, for a machine-learned architecture configured to predict click-through rate, the existing data instances may be training instances that have actual values for click-through rates.

In one instance, when the amount of available training data is relatively large, the prior distribution may be obtained from a histogram of the target variable. For example, when the actual values are categorical values, the histogram may indicate, for each category, the number or proportion of training instances that are associated with an actual value belonging to the category. As another example, when the actual values are numerical values, the histogram may divide the actual values into incremental intervals, and the histogram may indicate, for each interval, the number or proportion of training instances that are associated with an actual value belonging to the interval. In another instance, when the amount of available training data is relatively small, the prior distribution may be obtained by fitting a known probability distribution to the actual values of the target variable. For example, the reliability module 335 may fit a Gaussian distribution to the actual values of the target variable by determining the mean and variance of the Gaussian distribution. In yet another instance, the reliability module 335 may obtain the prior distribution of the target variable from other sources such as human annotation or experience or third-party data.

In one embodiment, during the inference process when predictions are being made for a given query instance, the prior distribution of the target variable may be obtained by selecting a subset of existing data instances that are associated with input data having above a threshold similarity with the query instance. For example, the prior distribution for a query instance corresponding to user profile information of a particular user may be obtained by identifying a subset of training instances that are associated with users that have above a threshold similarity with the particular user based on the input data for the training instances.

The reliability module 335 also determines a likelihood function $p_{like}(y|\mu)$ that is a probability distribution of the meta prediction given different values of the target variable. The likelihood function is determined based on the base prediction values and the meta prediction value. In one embodiment, the meta prediction y is assumed to be a Gaussian distribution $N(\mu, \sigma_y^2)$ with a probability distribution:

$$p(y|\mu, \sigma_Y^2) = \frac{1}{\sqrt{2\pi\sigma_Y^2}} \exp\left(-\frac{(y-\mu)^2}{2\sigma_Y^2}\right) \quad (1)$$

where $\sigma_y^2$ is the variance of the meta prediction. Thus, to obtain the likelihood function, an estimate of the variance of the meta prediction is needed.

In one embodiment, the reliability module 335 dynamically determines the meta prediction variance that changes with the value of an input query. Specifically, when a query instance of a request is closer to the training data used to train the stacked ensemble model, the meta prediction y should be close to the actual value $\mu$, and thus, the meta prediction variance $\sigma_y^2$ should be smaller, and vice versa. In such an embodiment, the reliability module 335 estimates the meta prediction variance using the plurality of base predictions. If the base predictions for a given query instance are statistically close to one another, the reliability measure of the meta prediction should be relatively high and the variance of the meta prediction should be relatively small, and vice versa.

In one embodiment, to determine the meta prediction variance based on the base predictions, a base prediction $x_i$ from an i-th base model is assumed to follow a Gaussian distribution $N(\mu, \sigma_{xi}^2)$ where $\sigma_{xi}^2$ is the variance of the base prediction of the i-th base model. In one instance, the meta prediction is a weighted linear combination of the base predictions $x_i$ such that:

$$y = \sum_{i=1}^{n} w_i x_i$$

where n is the number of base models, and $w_i$ is the trained weight assigned to the base prediction for the i-th base model that is learned during the training process. In such an instance, by maximizing the likelihood function with respect to the plurality of base predictions $x_1, x_2, \ldots, x_n$, the reliability module 335 may determine the estimated meta prediction variance $\hat{\sigma}_y^2$ as:

$$\hat{\sigma}_y^2 = \sum_{i}^{n} w_i^2 (x_i - \mu)^2 \quad (2)$$

and thus, the likelihood function in equation (1) may be represented as:

$$p_{like}(y|\mu) = \frac{1}{\sqrt{2\pi\hat{\sigma}_y^2}} \exp\left(-\frac{(y-\mu)^2}{2\hat{\sigma}_y^2}\right) = \quad (3)$$

$$\frac{1}{\sqrt{2\pi \sum_i^n w_i^2(x_i-\mu)^2}} \exp\left(-\frac{(y-\mu)^2}{2\sum_i^n w_i^2(x_i-\mu)^2}\right)$$

where the estimated meta prediction variance $\hat{\sigma}_y^2$ in equation (2) is substituted into equation (1).

In one embodiment, the reliability module 335 generates one or more variants of the likelihood function by substituting the target variable $\mu$ in the estimated meta prediction variance with an estimated target variable $\hat{\mu}$. In other words, the likelihood function in equation (3) can be represented as:

$$p_{like}(y|\mu) =$$

$$\frac{1}{\sqrt{2\pi\hat{\sigma}_y^2}} \exp\left(-\frac{(y-\mu)^2}{2\hat{\sigma}_y^2}\right) = \frac{1}{\sqrt{2\pi \sum_i^n w_i^2(x_i-\hat{\mu})^2}} \exp\left(-\frac{(y-\mu)^2}{2\sum_i^n w_i^2(x_i-\hat{\mu})^2}\right).$$

In one instance, the estimated target variable $\hat{\mu}$ is determined as the weighted arithmetic mean, given by:

$$\hat{\mu} = \frac{\sum_i^n w_i^2 x_i}{\sum_i^n w_i^2} \quad (4)$$

by maximizing the likelihood function with respect to $\mu$. In another instance, the estimated target variable $\hat{\mu}$ is determined as the weighted average, given by:

$$\hat{\mu} = \sum_i^n w_i x_i \quad (5)$$

and therefore, the estimated meta prediction variance $\hat{\sigma}_y^2$ becomes the weighted variance of the plurality of base predictions.

In one embodiment, the reliability module 335 performs a calibration step to reduce differences between the estimated variance of the meta prediction $\hat{\sigma}_y^2$ in the likelihood function and the real meta prediction variance $\sigma_y^2$ due to potential mismatches between assumptions and imperfect data. In one instance, the reliability module 335 adjusts the estimated meta prediction variance to match real values using one or more curve fitting techniques such as linear or non-linear regression techniques.

Specifically, the reliability module 335 may select a subset of the training data and generate the plurality of base predictions and the meta prediction for each selected instance by applying the stacked ensemble model to the input data of the selected instances. The reliability module 335 computes the estimated meta prediction variance values based on, for example, equations (2), (4), (5) (using the actual values of the data instances as values of $\mu$). The reliability module 335 may then divide the estimated variance values into a predetermined (e.g., 100) number of buckets. For each bucket, the reliability module 335 may compute the actual variance of the meta predictions by calculating the variance of the meta prediction values in the bucket.

Figure 4:
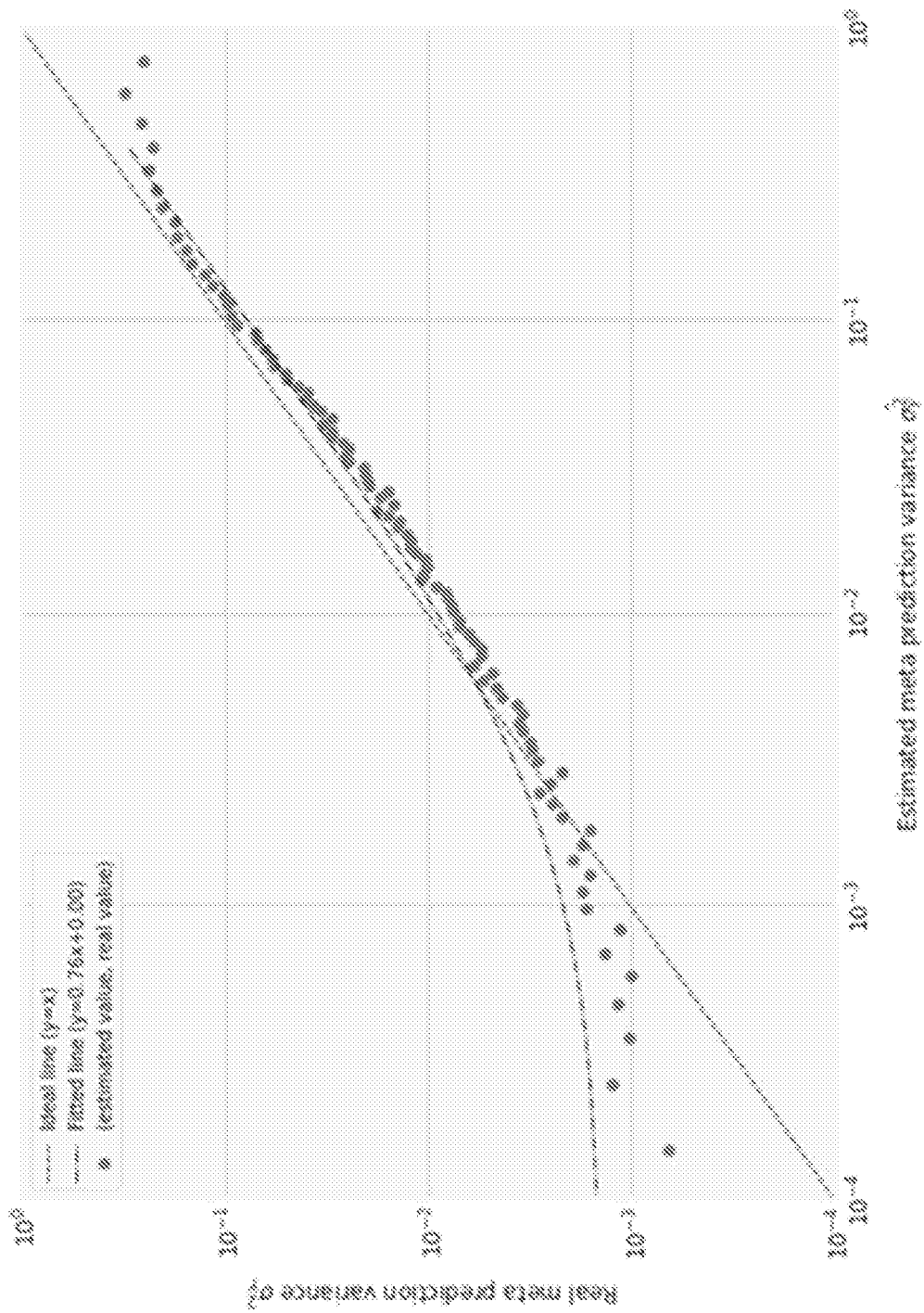
FIG. 4 illustrates an example calibration method for the meta prediction variance, in accordance with an embodiment.

FIG. 4 illustrates an example calibration method for the meta prediction variance, in accordance with an embodiment. FIG. 4 illustrates a calibration method performed by the reliability module 335 for an example dataset, where the horizontal axis indicates the value of the estimated variance of the meta prediction and the vertical axis indicates the value of the variance of the meta prediction within the respective bucket. As shown in FIG. 4, most estimated values of the meta prediction variance are relatively close to the real values of the meta prediction variance. The estimated values are relatively optimistic at the lower range where the estimated values are smaller than the real values. On the other hand, the estimated values are relatively conservative at the higher range where the estimated values are larger than the real values.

Thus, the reliability module 335 may perform a calibration method and fit a curve to the data points based on a regression technique. In FIG. 4, this is illustrated by the blue dotted curve indicated by the legend labeled "fitted line." For an estimated variance value, the fitted curve can be used to map the estimated value to a "fitted" actual value to improve the likelihood function. The fitted values can be substituted in the likelihood function in lieu of the estimated meta prediction variance.

The reliability module 335 generates a posterior distribution of the target variable $\mu$ given the meta prediction y by combining the prior distribution with the likelihood function. In one instance, the prior distribution $p_{prior}(\mu)$ is multiplied with the likelihood function $p_{like}(y|\mu)$ and is then normalized with a factor to formulate a probability distribution function, in which the integral or the sum under the distribution is equal to one. Specifically, both the prior distribution and the likelihood function based on the description above may be formulated as a function of different values for the target variable $\mu$. Thus, the reliability module 335 can identify a posterior distribution for a series of values or incremental ranges of the target variable $\mu$ by multiplying the prior probability for that value with the likelihood function for that value. In this manner, for a given query instance and the predictions for the query instance, the posterior distribution can be generated for different values of the target variable $\mu$.

Based on the posterior distribution of the target variable, the prediction system 140 determines the reliability measure for the meta prediction. In one embodiment, the reliability measure is expressed in terms of a confidence level that indicates a range the meta prediction for the query instance could be in. Thus, a large confidence interval indicates a relatively low reliability of prediction, while a narrow confidence interval indicates a relatively high reliability of prediction. In one instance, given a confidence level $\alpha$ (between 0 and 1), the confidence interval expressed as the range $[\mu_L, \mu_R]$ is determined by the reliability module 335 to satisfy the following condition:

$$\int_{\mu_L}^{\mu_R} p_{post}(\mu|y) d\mu = \alpha$$

indicating that the posterior probability between $\mu_L$ and $\mu_R$ is equal to $\alpha$, and the following condition:

$$p_{post}(\mu|y): \forall \mu \in [\mu_L, \mu_R] > p_{post}(\mu|y): \forall \mu \notin [\mu_L, \mu_R]$$

Indicating that the posterior probability density within the range $[\mu_L, \mu_R]$ is larger than that outside the range.

In one embodiment, the reliability module 335 performs a partition method to determine a confidence interval $[\mu_L, \mu_R]$ corresponding to a confidence level $\alpha$. Specifically, the reliability module 335 initializes $\mu_L$ to $\mu_{MIN}$ (e.g., 0) and $\mu_R$ to $\mu_{MAX}$ (e.g., 1), and an accumulate variable to zero. While the accumulate variable is less than $1-\alpha$, if the probability of the lower bound $p_{post}(\mu_L|y)$ is less than the probability of the upper bound $p_{post}(\mu_R|y)$, the accumulate variable is updated to the current value of the accumulate variable plus $p_{post}(\mu_L|y) \times h$ and the left edge $\mu_L$ is updated to the current value of the left edge $\mu_L + h$. Else, if the probability of the lower bound $p_{post}(\mu_L|y)$ is equal to or greater than the probability of the upper bound $p_{post}(\mu_R|y)$, the accumulate variable is updated to the current value of the accumulate variable plus $p_{post}(\mu_R|y) \times h$ and the right edge is updated to the current value of the right edge $\mu_R - h$. The values of $\mu_L$ and $\mu_R$ after the while loop has been terminated are returned. While the partition method is one example of computing the confidence interval, it is appreciated that in other embodiments, any method of using the posterior distribution of the target variable to generate a confidence interval or reliability measure can be used.

The reliability module 335 provides the reliability measure for the predictions to the prediction module 330, such that the prediction module 330 can provide the predictions and the reliability measure for the predictions as a response to the request. In this manner, the reliability module 335 can dynamically determine reliability measures as predictions with different prediction quality are generated during the inference process when the machine-learned architecture is used to service requests real-time. Based on the reliability measures, the online system 130 or other entities associated with the online system 130 can discern confidant predictions from those that are not and perform actions or target users more effectively than existing methods.

Method of Generating Dynamic Reliability Measure

Figure 5:
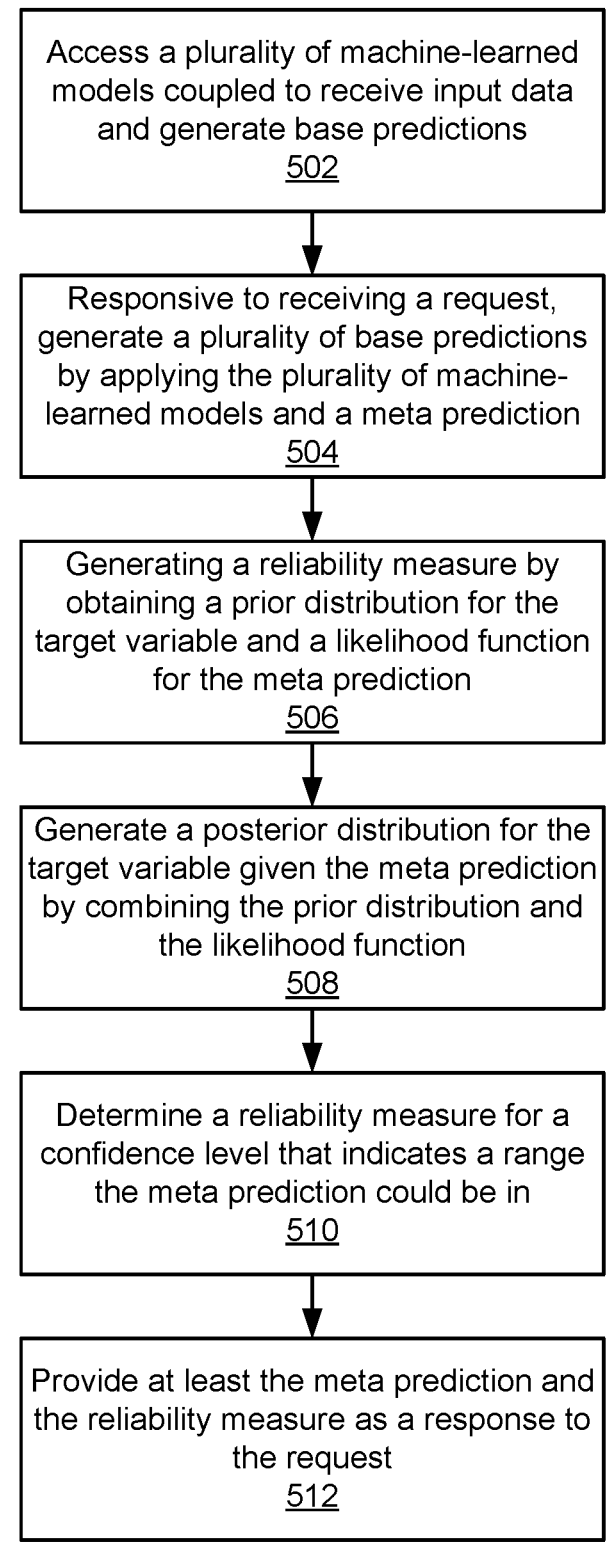
FIG. 5 illustrates a method of generating a dynamic reliability measure for a machine-learned architecture, in accordance with an embodiment.

FIG. 5 illustrates a method of generating a dynamic reliability measure for a machine-learned architecture, in accordance with an embodiment. In one embodiment, the process of FIG. 5 is performed by various modules of the online system 130, specifically the prediction system 140. Other entities may perform some or all of the steps of the process in other embodiments. Likewise, embodiments may include different and/or additional steps, or perform the steps in different orders.

The prediction system 140 accesses 502 a plurality of machine-learned models. A machine-learned model is coupled to receive input data and generate a base prediction indicating an estimated value for a target variable. Responsive to receiving a request including a query instance, the prediction system 140 generates 504 a plurality of base predictions for the query by applying the plurality of machine-learned models to the query instance. The prediction system 140 also generates a meta prediction by combining the base predictions for the query.

The prediction system 140 generates 506 a reliability measure for the meta prediction. The prediction system 140 obtains a prior distribution of the target variable. The prediction system 140 generates a likelihood function of the meta prediction given values of the target variable. The likelihood function may be determined based on the meta prediction and the plurality of base predictions. The prediction system 140 generates 508 a posterior distribution of the target variable given the meta prediction by combining the prior distribution and the likelihood function.

The prediction system 140 determines 510 a reliability measure for a confidence level for the meta prediction that indicates a range the meta prediction could be in. The prediction system 140 provides 512 at least the meta prediction and the reliability measure as a response to the request.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method, comprising:
    training, at a computing device, a machine-learned model of a plurality of machine-learned models stored in a database communicatively coupled to the computing device by using a forward pass and backpropagation to reduce a loss function, wherein the backpropagation updates parameters based on error terms obtained from the loss function, which is repeated until a convergence criterion is reached for a set of parameters;
    accessing, at the computing device from the database, the machine-learned model coupled to receive input data and generate a base prediction indicating an estimated value for a target variable;
    responsive to receiving a request including a query received by the computing device:
        generating, at the computing device, a plurality of base predictions for the query by applying the plurality of machine-learned models to the query, and
        generating, at the computing device a meta prediction by combining the base predictions for the query;
    generating, at the computing device, a posterior distribution for the target variable given the meta prediction, the generating comprising:
        obtaining a prior distribution of the target variable,
        generating a likelihood function of the meta prediction given values of the target variable, wherein the likelihood function is determined based on the meta prediction and the plurality of base predictions, and
        generating the posterior distribution of the target variable given the meta prediction by combining the prior distribution and the likelihood function;
    determining, at the computing device, a reliability measure with respect to a confidence level for the meta prediction that indicates a range the meta prediction could be in based on the posterior distribution; and
    providing, at the computing device, at least the meta prediction and the reliability measure as a response to the request.

2. The computer-implemented method of claim 1, wherein the posterior distribution is generated by at least multiplying the prior distribution of the target variable with the likelihood function.

3. The computer-implemented method of claim 1, wherein obtaining the prior distribution further comprises:
    identifying a plurality of data instances for the target variable, a data instance including input data and a known value of the target variable for the data instance; and
    obtaining the prior distribution of the target variable from a frequency histogram of the known values of the target variable for the plurality of data instances or a distribution fitted to the known values of the target variable for the plurality of data instances.

4. The computer-implemented method of claim 1, wherein for a given value of the target variable, the likelihood function for the meta prediction is a Gaussian distribution having a mean at the value of the target variable and a meta prediction variance.

5. The computer-implemented method of claim 4, wherein a base prediction is associated with a respective weight, and the meta prediction is generated by:
    weighting each base prediction with the respective weight for the base prediction, and combining the weighted base predictions to generate the meta prediction.

6. The computer-implemented method of claim 5, wherein the meta prediction variance in the likelihood function is estimated by:
    determining, for each base prediction, a deviation of the base prediction from the value of the target variable and weighting the deviation for the base prediction with the respective weight for the base prediction, and combining the weighted deviations to generate the estimate for the meta prediction variance.

7. The computer-implemented method of claim 6, wherein the value of the target variable in the estimate for the meta prediction variance is estimated as a weighted arithmetic mean of the base predictions or a weighted average of the base predictions.

8. The computer-implemented method of claim 1, further comprising:

responsive to receiving a second request including a second query:

generating a second plurality of base predictions for the second query by applying the plurality of machine-learned models to the second query, and generating a second meta prediction by combining the base predictions for the second query;

generating a second reliability measure for the second meta prediction, comprising:

generating a second likelihood function of the second meta prediction based on a value of the second meta prediction and the second plurality of base predictions, and generating a second posterior distribution of the target variable given the second meta prediction by combining the prior distribution and the second likelihood function, wherein the second reliability measure is different from the reliability measure.

9. The computer-implemented method of claim 1, wherein a first machine-learned model of the plurality of machine-learned models is of a different type of model, a different structure, or is associated with a different set of parameters than a second machine-learned model of the plurality of machine-learned models.

10. The computer-implemented method of claim 1, wherein the query includes information describing a user of a client device and the target variable is a likelihood the user will open a marketing message sent to the user.

11. A computer-implemented method, comprising:

training, at a computing device, a machine-learned model of a plurality of machine-learned models stored in a database communicatively coupled to the computing device by using a forward pass and backpropagation to reduce a loss function, wherein the backpropagation updates parameters based on error terms obtained from the loss function, which is repeated until a convergence criterion is reached for a set of parameters;

responsive to receiving a request to generate one or more predictions for a target variable, generating, at the computing device, a plurality of base predictions for a query of the request by applying the plurality of machine-learned models to the query and generating a meta prediction by combining the base predictions for the query;

generating, at the computing device, a posterior distribution for the target variable given the meta prediction, the generating comprising:

obtaining a prior distribution of the target variable, generating a likelihood function of the meta prediction given values of the target variable, wherein the likelihood function is determined based on the meta prediction and the plurality of base predictions, and generating the posterior distribution of the target variable given the meta prediction by combining the prior distribution and the likelihood function;

determining, at the computing device, the reliability measure for the meta prediction that indicates a degree of confidence in the meta prediction based on the posterior distribution; and providing, at the computing device, at least the meta prediction and the reliability measure as a response to the request.

12. The computer-implemented method of claim 11, wherein the posterior distribution is generated by at least multiplying the prior distribution of the target variable with the likelihood function.

13. The computer-implemented method of claim 11, wherein obtaining the prior distribution further comprises:

identifying a plurality of data instances for the target variable, a data instance including input data and a known value of the target variable for the data instance; and obtaining the prior distribution of the target variable from a frequency histogram of the known values of the target variable for the plurality of data instances or a distribution fitted to the known values of the target variable for the plurality of data instances.

14. The computer-implemented method of claim 11, wherein for a given value of the target variable, the likelihood function for the meta prediction is a Gaussian distribution having a mean at the value of the target variable and a meta prediction variance.

15. The computer-implemented method of claim 14, wherein a base prediction is associated with a respective weight, and the meta prediction is generated by:

weighting each base prediction with the respective weight for the base prediction, and combining the weighted base predictions to generate the meta prediction.

16. The computer-implemented method of claim 15, wherein the meta prediction variance in the likelihood function is estimated by:

determining, for each base prediction, a deviation of the base prediction from the value of the target variable and weighting the deviation for the base prediction with the respective weight for the base prediction, and combining the weighted deviations to generate the estimate for the meta prediction variance.

17. The computer-implemented method of claim 16, wherein the value of the target variable in the estimate for the meta prediction variance is estimated as a weighted arithmetic mean of the base predictions or a weighted average of the base predictions.

18. The computer-implemented method of claim 11, further comprising:

responsive to receiving a second request including a second query, generating a second plurality of base predictions for the second query by applying the plurality of machine-learned models to the second query, and generating a second meta prediction by combining the base predictions for the second query;

generating a second posterior distribution for the second meta prediction, comprising:

generating a second likelihood function of the second meta prediction based on a value of the second meta prediction and the second plurality of base predictions, and generating the second posterior distribution of the target variable given the second meta prediction by combining the prior distribution and the second likelihood function; and determining a second reliability measure based on the second posterior distribution, wherein the second reliability measure is different from the reliability measure.

19. The computer-implemented method of claim 11, wherein a first machine-learned model of the plurality of machine-learned models is of a different type of model, a different structure, or is associated with a different set of parameters compared to a second machine-learned model of the plurality of machine-learned models.

20. The computer-implemented method of claim 11, wherein the query includes information describing a user of a client device and the target variable is a likelihood the user will open a marketing message sent to the user.

* * * * *